No. 863,211. PATENTED AUG. 13, 1907.
A. G. PAUL.
HEATING SYSTEM.
APPLICATION FILED MAY 15, 1900.

2 SHEETS—SHEET 1.

WITNESSES:

INVENTOR
Andrew G. Paul
BY
Kenyon & Kenyon
ATTORNEYS.

No. 863,211. PATENTED AUG. 13, 1907.
A. G. PAUL.
HEATING SYSTEM.
APPLICATION FILED MAY 15, 1900.

2 SHEETS—SHEET 2.

UNITED STATES PATENT OFFICE.

ANDREW G. PAUL, OF BOSTON, MASSACHUSETTS, ASSIGNOR TO PAKIN COMPANY, A CORPORATION OF NEW YORK.

HEATING SYSTEM.

No. 863,211.  Specification of Letters Patent.  Patented Aug. 13, 1907.

Application filed May 15, 1900. Serial No. 16,811.

*To all whom it may concern:*

Be it known that I, ANDREW G. PAUL, a citizen of the United States, residing in Boston, in the county of Suffolk and State of Massachusetts, have invented a new and useful Improvement in Heating Systems, of which the following is a full, clear, and exact specification, reference being had to the accompanying drawings, which form a part hereof.

This invention relates to a heating system wherein steam or other suitable heating agent is circulated for the purpose of conveying and imparting heat to the places desired, and it consists in an improved construction and arrangement of the parts of such a system.

The object of my invention is to automatically control the effective heating work done by the system by means of the pressure within the heater or radiator or system, and at the same time to regulate this control by means of a thermostat placed in operative connection with some part of the heater or system. In the best form of my invention the thermostat is so constructed that it can be adjusted along the surface of the heater or radiator so as to be operated by the heat from any particular part thereof, and it is at the same time adapted to be cut out of operation either by being moved away from the radiator or the part of the system to which it was applied, or in any other suitable manner.

My invention also consists in the employment of a second thermostat adapted to limit the operation of the first thermostat. In the best form of my invention the second thermostat is adapted to be placed against the wall of the room or in some other suitable position, and is so connected with the first thermostat as to make the first thermostat operative or inoperative according to the temperature of the apartment or place in which the second thermostat is put.

My invention also consists in other features of construction and combinations of parts hereinafter described and claimed.

My invention is shown in the accompanying drawing, in which

Figure 1:
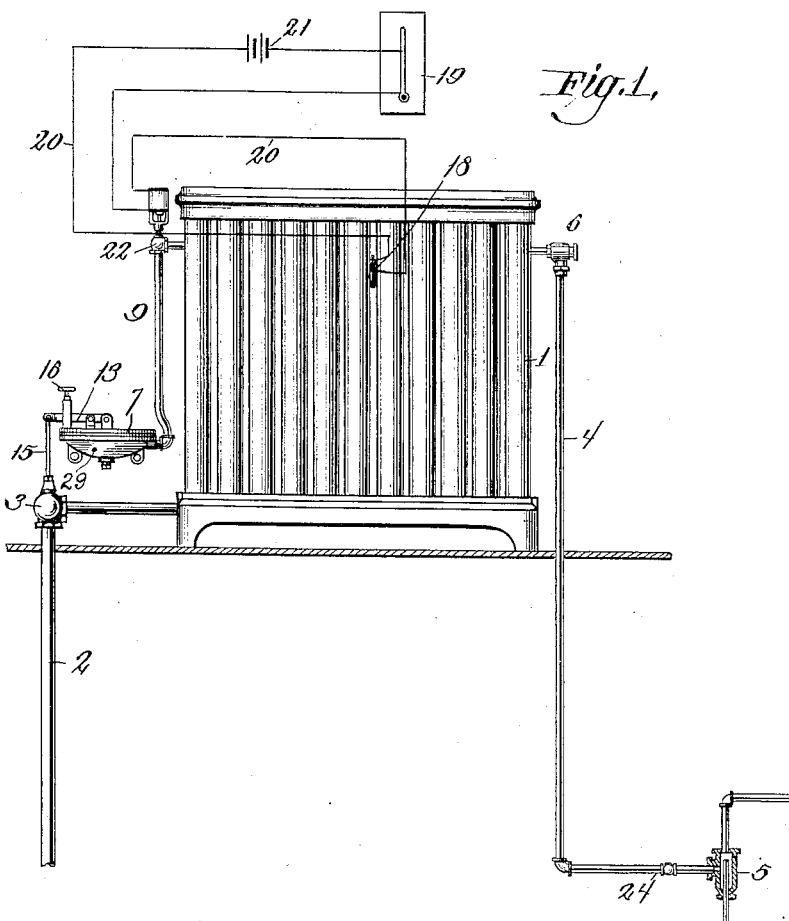
Figure 2:
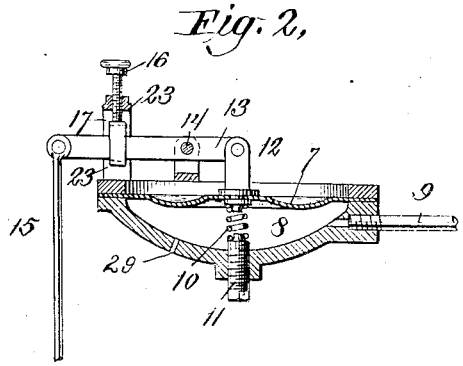
Figure 3:
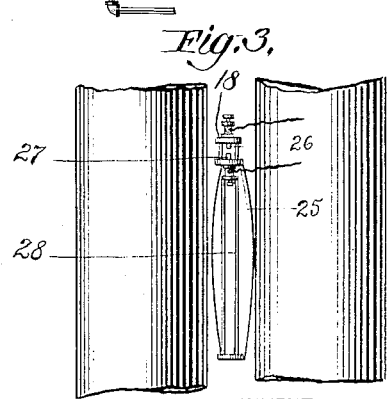
Figure 4:
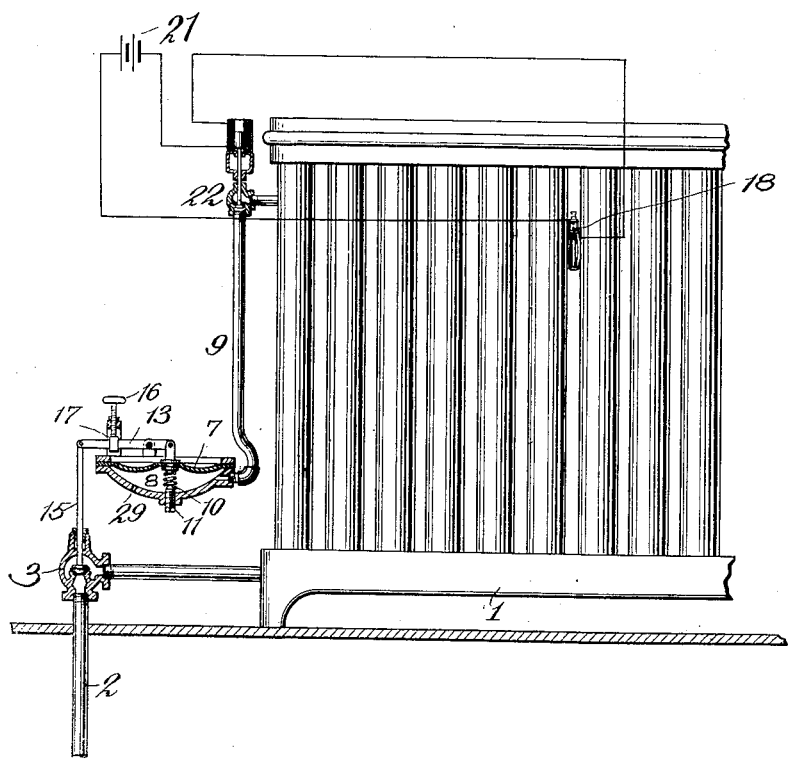

Figure 1 shows a single radiator embodying my improvement. Fig. 2 is a sectional view of the piston device for operating the supply valve. Fig. 3 is an enlarged view of my adjustable thermostat. Fig. 4 is a view similar to that shown in Fig. 1 except that a part of the radiator has been broken away and the valves and fluid pressure chamber are shown in section, and excepting also that only one theremostat is employed in the system.

Similar numbers denote similar parts in the different figures.

1 is a heater or radiator of any suitable construction.
2 is a pipe serving as both the supply and return pipe.
3 is the supply valve.
4 is an air pipe.
5 is an exhauster connected to the air pipe.
6 is an ordinary thermostatic air valve.
7 is a movable device in the form of a diaphragm.
8 is a fluid pressure chamber on one side of the diaphragm. This fluid pressure chamber is connected with the radiator by means of a pipe 9.
10 is a coiled spring operating to press the diaphragm in an upward direction. The tension of this spring can be regulated by the screw 11.
12 is an arm connected with the diaphragm and pivoted to the lever 13, which is fulcrumed at 14. The other end of the lever 13 is connected with the rod 15 which is connected at its lower end with the supply valve. When the pressure in the fluid pressure chamber 8 is decreased below the predetermined or desired point, the diaphragm falls and thereby opens the supply valve. When the pressure in this fluid pressure chamber is increased above the predetermined or desired point, the diaphragm is moved in the opposite direction and closes the supply valve.

16 is a screw adapted to be screwed up and down in a post 17. The screw 16 carries a loop encircling the lever 13 and closed at its upper and lower ends as shown in Fig. 2. The space between the ends of the loop is sufficient to give the lever 13 all the necessary play in ordinary operation. By screwing the screw 16 down, however, the supply valve can be shut, or by screwing it up the supply valve can be opened as may be necessary when the system is first put into operation.

18 is a thermostat of any suitable form adapted to be applied to or between any two tubes of the radiator. The particular construction of this thermostat can be greatly varied. One form is shown in detail in Fig. 3. It consists of a suitable casing 25, adapted to be inserted between the tubes of a radiator as shown. This casing is provided with a suitable contact point 26 at its upper end connected with one of the wires of the circuit 20. The other contact point 27 is carried at the upper end of the expanding member 28, which is attached at its lower end to the casing 25. This member 28 can be made of any suitable expansible material. This thermostat can be placed in operative connection with any part of the radiator so as to be expanded by the heat from said part. It is adapted to be adjusted along the surface of the radiator or to be cut out of operation by being entirely removed therefrom. 19 is a thermostat of any ordinary construction adapted to be placed on the wall of a room or in any other suitable position. The thermostat 19 is connected in circuit with the thermostat 18 by the wires 20. 21 is a suitable battery or generator of any form. 22 is a solenoid valve placed upon the pipe 9, the coil of which is included in the circuit formed by the wires 20. These two thermostats could be connected in any other suitable manner for the purpose desired. The fluid pressure chamber 8 must be provided with a vent 29 so that when the valve 22 is closed the pressure on both sides of the diaphragm 7 will be equalized, and the spring 10 will operate to close the supply valve.
This vent can be either the ordinary pin-hole vent such as shown passing through the casing which supports the diaphragm 7, or the valve 22 can be made in any other suitable form.

24 is a check valve on the air-pipe.

The operation of the system is as follows. Assuming that the thermostat is placed in operative connection with or in proximity to the 6th tube, as shown in Fig. 1, and that the radiator is cold and the valve 22 therefore open, the system is started either by opening the supply valve by means of the screw 16 or by putting the exhauster 5 into operation so as to remove the air. The steam enters the radiator and fills the same. Should the pressure in the radiator at any time be sufficient to close the supply valve, that valve will remain closed only until the pressure falls to the predetermined or desired point, when it will again open and admit a fresh supply of the heating vehicle. As soon as the thermostat 18 has been heated sufficiently, its expanding member will be expanded so as to close the circuit 20 at that point. When the room in which the thermostat 19 is placed has been raised in temperature to the desired point, the circuit will be closed at that point also, thereby establishing the circuit and closing the valve 22. When the valve 22 is closed, the pressures are equalized on both sides of the diaphragm 7 by means of the vent admitting pressure to the fluid pressure chamber 8, and as a result of this the supply valve is closed. The radiator then gradually cools until the thermostat 18 is cooled sufficiently to break the circuit at that point, when the valve 22 is again opened and the decreased pressure in the radiator causes the supply valve to be opened so as to admit a fresh quantity of the heating vehicle. The first six tubes of the radiator are again heated until the heating vehicle reaches the sixth tube and heats that, and thereby heats the thermostat 18 and again closes the valve 22 when the supply valve is again closed. In this way the first six tubes of the radiator are kept in practically continuous operation at any predetermined pressure.
The pressure at which the supply valve is closed can be regulated by regulating the tension on the spring 10. Any given number of tubes or any desired part of the radiating surface can be kept in operation in this manner by placing the thermostat 18 against any desired point on the radiator. If at any time the temperature of the room in which the thermostat 19 is placed, falls below the desired point, the circuit will be broken at that point and the entire radiator will be brought into action until the temperature of the room is again restored to the required degree. In any particular situation one can quickly ascertain how much of the system must be kept in operation all of the time in order to maintain the desired temperature. The thermostat 18 can be so placed as to keep this portion of the system in operation as already explained, as a result of which the work of the system will be very uniform and the temperature of the room will be steadily maintained at any point desired, and with very little variation, and without the danger of overheating. It is manifest that the thermostat 18 might be employed to control the valve 22 without using any additional thermostat, and that some of the advantages of my invention would be secured in this way.

In Fig. 4 I have shown a modification of my invention in which the valve 22 is controlled by the thermostat 18 alone. This form of my invention operates in the manner already explained except that when the thermostat 18 is heated to the proper point, the valve 22 is closed and the supply valve 3 is consequently closed and no more steam is supplied to the radiator until the thermostat 18 has cooled sufficiently to break the circuit and thereby cause the valve 22 to be opened. In Fig. 4 the valve 22 is represented as open but the supply valve 3 is represented as closed. This would be the condition of the apparatus when the pressure in the radiator had risen sufficiently to close the valve 3 but had not yet heated the thermostat 18 sufficiently to close the valve 22.

My invention thus secures a very accurate regulation of the temperature of the place that is being heated, and does this economically inasmuch as just enough of the heating surface is kept in operation to accomplish the results desired. This operation also, is entirely automatic.

The apparatus is simple and economical in construction, and is easily manipulated. The effective heating work of the system can be very nicely controlled.

What I claim as new and desire to secure by Letters Patent, is:

1. The combination with a radiator of means for controlling the operation of the same, a casing, a movable device in said casing controlling said means, the said casing having a fluid pressure chamber on one side of said device, and a passage connecting the fluid pressure chamber with the radiator, a thermostat placed in operative connection with some part of the radiator and adapted to control said passage and a second thermostat adapted to put the first thermostat into or out of operative connection, substantially as set forth.

2. The combination with a radiator of means for controlling the operation of the same, a casing, a movable device in said casing controlling said means, the said casing having a fluid pressure chamber on one side of said device, and a passage connecting the fluid pressure chamber with the radiator, a valve on said passage, a thermostat placed in operative connection with some part of the radiator and adapted to control said valve, and a second thermostat adapted to put the first thermostat into or out of operative connection, substantially as set forth.

3. The combination with a radiator of means for controlling the operation of the same, a casing, a movable device in said casing controlling said means, the said casing having a fluid pressure chamber on one side of said device, and a passage connecting the fluid pressure chamber with the radiator, a valve on said passage, a thermostat placed in close proximity to some intermediate part of the radiator and adapted to control said valve, and a second thermostat adapted to put the first thermostat into or out of operative connection, substantially as set forth.

4. The combination with a radiator of means for controlling the operation of the same, a casing, a movable device in said casing controlling said means, the said casing having a fluid pressure chamber on one side of said device, and a passage connecting the fluid pressure chamber with the radiator, a thermostat adapted to be placed in operative connection with some part of the radiator and to be cut out of effective operation when desired, and adapted to control said passage, and a second thermostat adapted to put the first thermostat into or out of operative connection, substantially as set forth.

5. The combination with a radiator of means for controlling the operation of the same, a casing, a movable device in said casing controlling said means, the said casing having a fluid pressure chamber on one side of said device, and a passage connecting the fluid pressure chamber with the radiator, a thermostat adapted to be placed in operative connection with some part of the radiator and to be moved away from said position when desired, and adapted to control said passage, and a second thermostat adapted to put the first thermostat into or out of operative connection, substantially as set forth.

6. The combination with a radiator of means for controlling the operation of the same, a casing, a movable device in said casing controlling said means, the said casing having a fluid pressure chamber on one side of said device, and a passage connecting the fluid pressure chamber with the radiator, a thermostat adapted to be adjusted along the surface of the heater or radiator and to control said passage, and a second thermostat adapted to put the first thermostat into or out of operative connection, substantially as set forth.

7. The combination with a radiator of means for controlling the operation of the same, a casing, a movable device in said casing controlling said means, the said casing having a fluid pressure chamber on one side of said device, and a passage connecting the fluid pressure chamber with the radiator, a valve on said passage, a thermostat adapted to be placed against different parts of the heater or radiator and to control said valve, and a second thermostat adapted to put the first thermostat into or out of operative connection, substantially as set forth.

8. The combination with a radiator of means for controlling the operation of the same, a casing, a movable device in said casing controlling said means, the said casing having a fluid pressure chamber on one side of said device, and a passage connecting the fluid pressure chamber with the radiator, a thermostat placed in operative connection with some part of the radiator and adapted to control said passage, substantially as set forth.

9. The combination with a radiator of means for controlling the operation of the same, a casing, a movable device in said casing controlling said means, the said casing having a fluid pressure chamber on one side of said device, and a passage connecting the fluid pressure chamber with the radiator, a valve on said passage, a thermostat placed in close proximity to some intermediate part of the radiator and adapted to control said valve, substantially as set forth.

10. The combination with a radiator of means for controlling the operation of the same, a casing, a movable device in said casing controlling said means, the said casing having a fluid pressure chamber on one side of said device, and a passage connecting the fluid pressure chamber with the radiator, a thermostat adapted to be placed in operative connection with some part of the radiator and to be cut out of operation when desired, and adapted to control said passage, substantially as set forth.

11. The combination with a radiator of means for controlling the operation of the same, a casing, a movable device in said casing controlling said means, the said casing having a fluid pressure chamber on one side of said device, and a passage connecting the fluid pressure chamber with the radiator, a thermostat adapted to be placed in operative connection with some part of the radiator and to be moved away from said position when desired, and adapted to control said passage, substantially as set forth.

12. The combination with a radiator of means for controlling the operation of the same, a casing, a movable device in said casing controlling said means, the said casing having a fluid pressure chamber on one side of said device, and a passage connecting the fluid pressure chamber with the radiator, a thermostat adapted to be adjusted along the surface of the heater or radiator and to control said passage, substantially as set forth.

13. The combination with a radiator of means for controlling the operation of the same, a casing, a movable device in said casing controlling said means, the said casing having a fluid pressure chamber on one side of said device, and a passage connecting the fluid pressure chamber with the radiator, a valve on said passage, a thermostat adapted to be placed against different parts of the heater or radiator and to control said valve, substantially as set forth.

14. The combination with a radiator, of a supply pipe, a valve on the supply pipe, a movable device in said casing controlling said valve, a casing having a fluid pressure chamber on one side of said movable device, and a passage connecting the fluid pressure chamber with the radiator, a thermostat placed in operative connection with some part of the radiator and adapted to control said passage, substantially as set forth.

In testimony whereof, I have signed my name to this specification, in the presence of two subscribing witnesses.

ANDREW G. PAUL.

Witnesses:
 THOMAS K. PETERS,
 NANNIE FINLEY.